Figure 1:
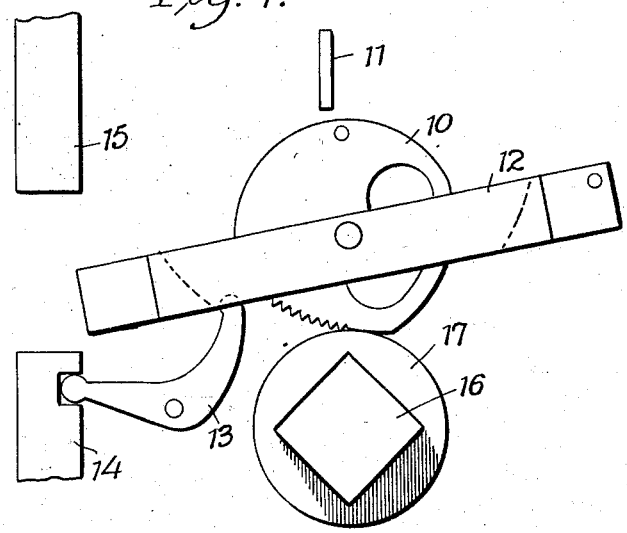

Nov. 25, 1930.  A. H. NARROW  1,782,694
KEYBOARD CAMROLL
Filed July 19, 1929

INVENTOR.
Anton H. Narrow
BY John W Farley
ATTORNEY.

Patented Nov. 25, 1930

1,782,694

UNITED STATES PATENT OFFICE

ANTON H. NARROW, OF MEMPHIS, TENNESSEE

KEYBOARD CAM ROLL

Application filed July 19, 1929. Serial No. 379,448.

My said invention relates to a keyboard camroll for type-setting machines and it is an object thereof to provide a camroll with a covering of such character that worn parts thereof can readily be replaced without discarding the entire covering. In constructions of the character heretofore used, such as illustrated on pages 5, 6 and 8 of Linotype Instruction Book published 1925 by Mergenthaler Linotype Co., the covering of the shaft consisted of a rubber tube, such tubes spacing the shaft P from the cams E of a series arranged along the shaft P which cams operate various mechanisms of the type-setting machine in well-known manner. Certain parts of the machine are used much more frequently than others and consequently their cams rotate more frequently in a given space of time with the result that the corresponding portion of the roll covering wears out more quickly. For example that part of the roll that operates in connection with the key that makes the spaceband wears out more quickly than any other part. The part corresponding to the key for the letter E is perhaps next and the other vowels also cause the corresponding parts of the roll to wear out quickly, as the same cam strikes the same place on the cover every time that a particular key is used. The covering is ordinarily a rubber tube and the rubber vulcanizes so that it is hard to remove from the metal shaft, it usually being necessary to peel the covering off in strips. From the foregoing it will be seen also that whenever any part of the covering becomes worn to a certain extent the entire tube must be removed and discarded.

According to my invention the tube is replaced by a series of rings which are held against rotation relatively to the shaft and which can readily be removed so that the worn rings may be discarded and the others put to further use, a camroll being therefore much more easily repaired and at less cost. As is well-known, it is impractical to make the camroll of metal by reason of the excessive wear between the metal of such a roll and that of the cams, but other material than rubber can be used in the rings. The cost of the separate rings would obviously be very small as compared with the cost of the necessary lengths of rubber tubing, the two camroll shafts each cooperating with a series of cams and the piece of tubing in present practice extending the full length of the camroll.

Figure 2:
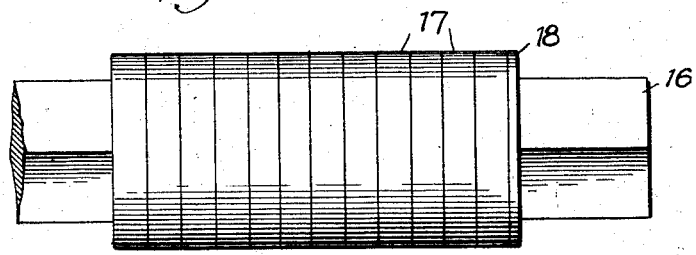
Figure 3:
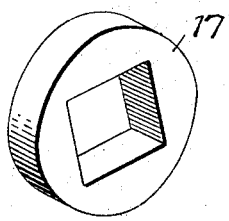
Figure 4:
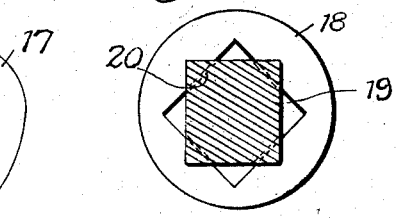

Referring to the drawings, which are made a part of this application and in which similar reference characters indicate similar parts:

Fig. 1 is an end view of certain parts of the linotype machine, illustrating the use of my invention, Fig. 2, a detail of the keyboard camroll, Fig. 3, a detail of a ring adapted to be placed on the shaft of the camroll, and Fig. 4, a detail of parts shown in Fig. 2.

In the drawings reference character 10 indicates one of the cams of known construction, such as is now operated by the conventional camroll. A keyboard cam stop 11 coacts with the cam and the conventional keyboard cam yoke is illustrated at 12, the usual trigger 13 for supporting the yoke at certain times being illustrated in connection with its keyboard key bar 14 and a portion of the keyboard rod 15 being also shown in Fig. 1. All these parts are of conventional character. In place of the conventional camroll I have shown a square shaft 16 bearing a covering consisting of rings 17 shaped internally to fit the square outlines of the shaft 16. It will be understood that the shaft need not necessarily be square, it being sufficient that the shaft be non-circular and that the rings fit thereon so as to be held against rotation relatively to the shaft. Preferably I use rings of rubber though such materials as leather and fiber may be utilized if desired. At one end of the series of rings 17 I have shown a holding means comprising a washer 18 having a square opening at 19 to correspond to the cross section of the shaft which has notches at 20 so that the washer may be turned through a small arc to hold the same against endwise movement relatively to the shaft. At least one such washer may be used at each end of the shaft or any other suitable securing means may be substituted therefor.

It will be obvious to those skilled in the art that various modifications may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:—

1. In a type-setting machine, a series of cams, a keyboard camroll cooperating therewith, said camroll comprising a non-circular shaft, and a series of rings of non-metallic material fitting on said shaft and located to contact with said cams.

2. In a type-setting machine, a series of cams, a keyboard camroll cooperating therewith, said camroll comprising a square shaft, and a series of rings of non-metallic material fitting on said shaft and spacing said cams therefrom.

3. In a type-setting machine, a series of cams, a keyboard camroll cooperating therewith, said camroll comprising a square shaft, and a series of rubber rings fitting on said shaft and spacing said cams therefrom.

4. In a type-setting machine, a series of cams, a keyboard camroll cooperating therewith, said camroll comprising a non-circular shaft, a series of rings of non-metallic material fitting on said shaft and located to contact with said cams, and means at the ends of the series for holding the rings in place on the shaft.

In testimony whereof I affix my signature.

ANTON H. NARROW.